United States Patent [19]

Stoll et al.

[11] 4,088,061
[45] May 9, 1978

[54] PISTON/CYLINDER ASSEMBLIES

[76] Inventors: Kurt Stoll, Lenzhalde, Esslingen a. N.; Gerhard Hihn, Schurwaldstr. 7, Berkheim, both of Germany

[21] Appl. No.: 729,425

[22] Filed: Oct. 4, 1976

Related U.S. Application Data

[63] Continuation of Ser. No. 516,587, Oct. 21, 1974, abandoned.

[30] Foreign Application Priority Data

Nov. 7, 1973 Germany ............................. 2355593

[51] Int. Cl.² ............................................. F15B 15/22
[52] U.S. Cl. ......................................... 91/26; 91/408; 277/205
[58] Field of Search ................ 91/394, 405, 408, 409, 91/24, 25, 26, 396; 277/205; 92/85 B

[56] References Cited

U.S. PATENT DOCUMENTS

| | | | |
|---|---|---|---|
| 2,719,510 | 10/1955 | Elder | 91/26 |
| 2,935,047 | 5/1960 | Ortman | 91/396 |
| 3,194,570 | 7/1965 | Haynie | 277/182 |
| 3,238,850 | 3/1966 | Desmarchelier | 91/408 |
| 3,247,767 | 4/1966 | Aslan | 91/408 |
| 3,267,815 | 8/1966 | Ortman | 91/408 |
| 3,440,930 | 4/1969 | Olson | 91/26 |
| 3,805,672 | 4/1974 | Pekrul | 91/396 |
| 3,913,460 | 10/1975 | Wright | 277/205 |

Primary Examiner—Martin P. Schwadron
Assistant Examiner—Abraham Hershkovitz
Attorney, Agent, or Firm—Watson, Cole, Grindle & Watson

[57] ABSTRACT

In a piston/cylinder assembly in which the power strokes of the piston are damped, there is a pressure chamber on one side of the piston and an external pipe which serves for the discharge and supply pressure medium. A restricted zone is provided in a pipe which connects the external pipe to the pressure chamber for limiting the flow of motive gas therethrough. A return pipe connects the external pipe with the pressure chamber and has a one-way valve which closes the return pipe when the pressure medium is discharged from the pressure chamber and opens it when pressure medium is supplied from the external pipe. A connecting line extends from the external pipe to the pressure chamber, and the piston has a member projecting therefrom engageable in the connecting line when the damping movement begins to close that line.

4 Claims, 4 Drawing Figures

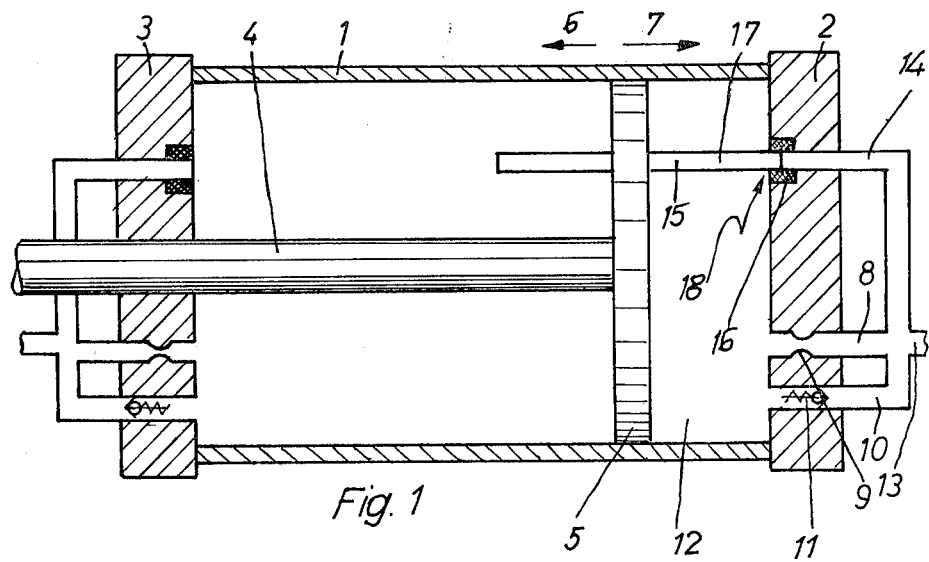
Fig. 1
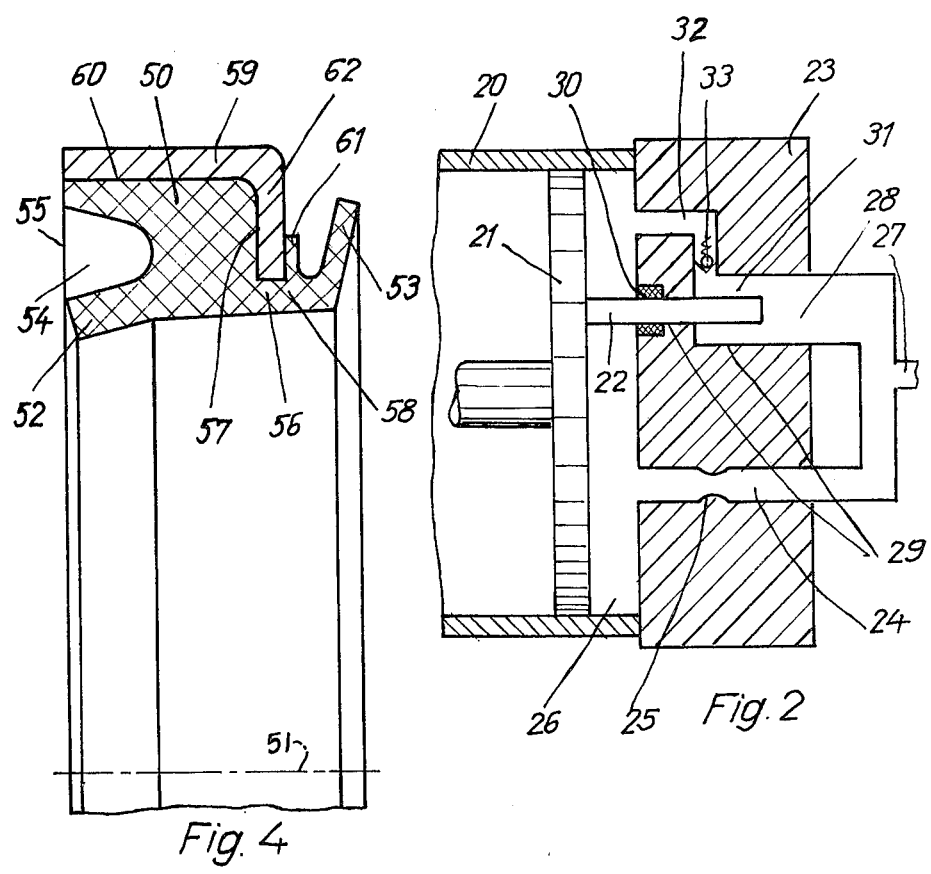
Fig. 2
Fig. 4

PISTON/CYLINDER ASSEMBLIES

This is a continuation, of application Ser. No. 516,587 filed Oct. 21, 1974 now abandoned.

IMPROVEMENTS IN PISTON/CYLINDER ASSEMBLIES

The present invention relates to a piston/cylinder assembly in which the power strokes of the piston are damped and which comprises a pressure chamber located, when viewed in the direction of the damped movement, between the piston and the cylinder cover and which connects with an external pipe through which the pressure medium is discharged or supplied, through a pipe section with a restricted zone or throttling zone.

BACKGROUND OF THE INVENTION

With a piston/cylinder assembly of this type, the pressure medium, which is compressed during the forward stroke of the piston, is discharged through the restricted pipe, one and the same external pipe being used for the discharge of the pressure medium and for the supply of the pressure medium to the cylinder to effect the reverse stroke of the piston. Since the pressure medium has to pass through the restricted zone in order to be admitted into the pressure chamber after leaving the external pipe, the reverse movement is somewhat delayed resulting in a relatively slow start of the reverse stroke. This, however, is often considered undesirable.

SUMMARY OF THE INVENTION

It is an aim of the invention to provide a piston/cylinder combination of the type described above where the forward movement of the piston is damped while the movement in the reverse-direction, which follows the damped forward movement, occurs without delay, thus ensuring a rapid start of the reverse stroke of the piston.

According to the invention, the problem has been solved by means of an additional pipe which by-passes the restricted zone, and connects the pressure chamber or cylinder with the external pipe as an individual return pipe which is controlled by a non-return valve which closes the return pipe when the pressure medium is discharged from the cylinder, and opens the return pipe when pressure medium is supplied to the system from the external pipe. This additional return pipe therefore constitutes a by-pass which is effective in one direction only; it does not interfere with the effect of the restricted pipe during the forward motion. In other words, the return pipe enables the forward movement to be delayed as desired, while it eliminates the restricting effect during the return movement. The reverse stroke of the piston can therefore be initiated without delay, the pressure medium being essentially admitted to the piston through the return pipe which does not contain a restricted zone.

It is a further object of the invention to ensure that the arrangement of the piston/cylinder assembly, apart from enabling the piston to re-start rapidly on its reverse stroke, makes it possible to adjust the length of the damped stroke in a simple manner. To achieve this aim, a further connecting pipe is provided between the external pipe and the cylinder. This additional pipe is controlled by a valve which is closed by the piston, or an adjustable operating element co-ordinated with it, when the damped piston movement begins, said operating element of the valve in the connecting pipe being a buffer piston in front of the main piston, which, when inside the pipe, acts as a seal when the damped movement begins, the valve being formed by the buffer piston and a packing inside the connecting pipe. The movement of the main piston is therefore not damped before the buffer piston enters the connecting pipe, because the pressure medium is discharged not only through the restricted pipe but also, and in essence, through the additional pipe which connects the cylinder with the common external pipe. Only when the buffer piston closes the connecting pipe is the pressure medium forced to flow through the restricted zone towards the external pipe. The length of the damped path is easily adjustable by varying the length of the buffer piston. The movements of the main piston can be damped in either direction, the damped path length being adjustable in both cases.

Thus the invention provides a piston/cylinder assembly capable of damping the power strokes of the piston and ensuring a rapid start to the reverse stroke after completion of the damped forward stroke and it provides moreover simple means by which to adjust the length of the damped movement. The design of this new combination of piston and cylinder is simple, and the number of parts is small. Manufacturing costs are correspondingly low, and the components are easily assembled.

BRIEF DESCRIPTION OF THE DRAWINGS

Embodiments of the invention will now be described, by way of example only, with reference to the accompanying drawings, in which:

FIG. 1 shows one embodiment of the invention schematically in section;

FIG. 2 is a cross-section through part of a second embodiment, again shown schematically;

FIG. 4 shows an enlarged section through a detail according to FIG. 3.

DESCRIPTION OF THE PREFERRED EMBODIMENTS

Figure 3:
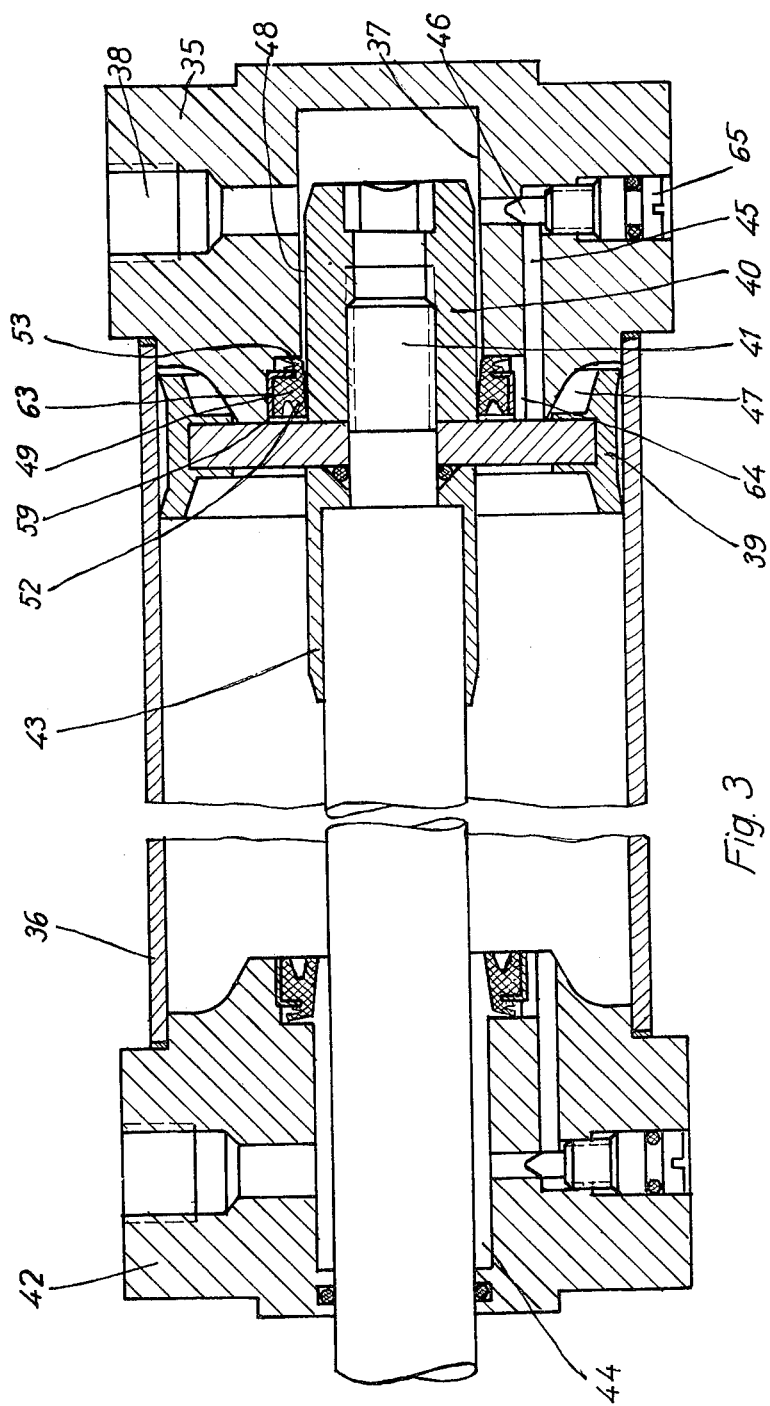
FIG. 3 shows a third embodiment of the invention in section.

In the schematic arrangement shown in FIG. 1, a cylinder 1 is shown which is closed at its opposite ends by end covers 2 and 3 respectively, the piston rod 4 of the piston 5 extending from the cylinder 1 through the cover 3. The movements of the piston 5 in the directions of arrows 6, 7 can be temporarily damped. Bearing in mind that the piston/cylinder system is based on an essentially symmetrical design, it should be sufficient for the understanding of the invention to limit the description of the piston/cylinder assembly to one half of the system. Thus in the following, the region of the cylinder cover 2 is described.

The cylinder cover 2 accommodates a restricting pipe 8 which incorporates a bottleneck or restricted zone 9, and a return pipe 10 which is controlled by a non-return valve 11 that opens towards the inside of the cylinder. These parts are shown purely schematically. Both the restricting pipe 8 and the return pipe 10 lead, on the one hand, into the pressure chamber 12 defined between the piston 5 and the cylinder cover 2 and, on the other hand, into a common external connecting pipe 13. If the cylinder cover 2 were provided with a restricting pipe 8 and a return pipe 10 only, the piston/- cylinder system would work as follows: With the piston 5 moving towards the cylinder cover 2 in the direction of the arrow 7, the pressure medium leaving the pressure chamber 12 would close the non-return valve 11 and therefore the medium would be force to pass through the bottleneck zone 9 in the restricting pipe 8 and be admitted into the external connecting pipe; the movement of the piston would be thus damped accordingly. When the forward movement in the direction of the arrow 7 was completed, the external connecting pipe would no longer accept pressure medium from the system, but would readily supply it to the pressure chamber 12 to initiate the reverse movement in the direction of the arrow 6, whereby the pressure medium, flowing in this new direction, would open the non-return valve 11. As a result, the pressure medium would be admitted into the pressure chamber 12 without restriction and in relatively large quantities, and the piston 5 would not be delayed in starting the reverse stroke.

However, the cylinder cover 2 contains an additional connecting pipe 14, which likewise leads, on the one hand, into the pressure chamber 12 and, on the other hand, into the external connecting pipe 13. A buffer piston 15 is co-ordinated with this connecting pipe 14; it extends from the main piston 5 and is pushed into the connecting pipe 14 when the piston 5 has moved forward in the direction of the arrow 7. So long as, during this forward stroke, the buffer piston 15 is outside the connecting pipe 14, the pressure medium does not flow towards the external connecting pipe through the bottleneck zone 9 alone, but also through the additional connecting pipe 14. This means that the movement of the main piston 5 is not damped before the buffer piston 15 enters the connecting pipe 14. However, damping occurs as soon as the buffer piston 15 is pushed into the pipe 14, because the pressure medium has now to be discharged through the restricting pipe with the bottleneck 9.

At the point where the connecting pipe 14 joins the pressure chamber 12, a packing 16 is provided which, together with the buffer piston 15, acts as an operating element 17, the unit constituting in fact a valve 18 which controls the connecting pipe. Thus the connecting pipe 14, and the buffer piston 15, ensure that the movement of the main piston is only temporarily damped, the damped path depending on the length of the piston 15.

FIG. 2 shows a cylinder 20, a power piston 21 with associated buffer piston 22, and a cylinder cover 23 through which extends a restricting pipe 24 with a bottleneck zone 25, connecting the pressure chamber 26 with an external pipe 27. An internal connecting pipe 29 has a large diameter portion 28 joined to the external connecting pipe 27, the diameter of the portion. 28 exceeding that of the buffer piston 22 which fits into the pipe 29, sealing the latter off at a packing 30. The large diameter portion 28 of the pipe 29 also constitutes a first section of a return pipe 31, a second section of which branches off the large diameter portion 28 and, by-passing the packing 30, leads into the pressure chamber 26. A non-return valve 33 in the second section 32 of the return pipe opens towards the inside of the cylinder.

This embodiment functions in a manner similar to the embodiment shown in FIG. 1. Again, no damping of the main piston movement occurs until the buffer piston 22 enters the connecting pipe 29, the greatest part of the pressure medium being carried off through the connecting pipe 29. Having entered the connecting pipe 29 through the packing 30, the buffer piston 22 closes the pipe 29 and the pressure medium is discharged solely through the restricting pipe with the bottleneck zone 25, thus damping the movement of the main piston. When the main piston 21 receives pressure from the external pipe 27 after completion of the damped piston movement, its return stroke can start without delay, the pressure medium being admitted into the pressure chamber 26 not only through the restricting zone 25 but also, and largely, through the return pipe 32, whose non-return valve 33 is open.

FIG. 3 shows another embodiment of the invention. It is similar to the one shown in FIG. 2. In FIG. 3, a double acting cylinder is shown. The cylinder cover 35 has a central axial bore 37 which opens into the cylinder 36, with an external connection pipe 38 branching off, through which the pressure medium is either discharged or supplied. The main piston 39 is shown in its end position where a buffer piston 40 which is connected with the main piston 39 engages with the central bore 37. When the main piston 39 is in its other end position a second buffer piston 43 engages with an axial bore 44 in the cylinder cover 42.

A restricting pipe 45 with a bottleneck zone 46 leads, on the one hand, into the central axial bore 37 and, on the other hand, into the pressure chamber 47. The diameter of the central axial bore 37 exceeds that of the buffer piston 40, the annular gap 48 between the buffer piston 40 and the central bore being sealed off against the pressure chamber 47 by means of a packing ring 49. This packing ring 49 is shown in FIG. 4 to an enlarged scale. It comprises a double lip 50 directed towards the cylinder 36. The inner or sealing lip 52 of the double lip extends towards the axis 51 of the central bore in a direction which is inclined in relation to the shaft and to the centre of the cylinder. At its end opposite to the cylinder 36, the annular packing 49 comprises a non-return lip 53, which extends outwards at an angle, view in the axial and radial directions. The cross-section of the double-lip portion 50 is essentially rectangular with an indentation 54 at the side 55 of the rectangle which faces the cylinder 36, this indentation separating the two individual lips of the double lip 50. A sealing web 58, which forms an integral part of the inner portion 56 of the opposite side 57 of the rectangle, extends integrally into the non-return lip 53 which is inclined towards the outside. A rigid mounting ring 59 of L-shaped cross-section is provided around the circumference of the double-lip 50, covering both the third side 60 of the rectangular cross-section which lies away from the central bore, and the second side 57 of the rectangle and extending to the sealing web 58. A nose 61 extends from the sealing web 58 between the second side 57 of the rectangle and the non-return lip 53 in such a manner that it rests against the radial leg 62 of the mounting ring 59. This mounting ring can consist, for example, of steel.

The annular packing 49, together with the mounting ring 59, is pressed into a cylindrical recess 63 formed at the end of the central axial bore 37 adjacent the cylinder 36. The axial length of the recess 63 approximately corresponds to the axial length of the annular packing 49 including the non-return lip 53. An axial groove 64 is provided in the periphery of the recess 63, extending over its entire length. Several such grooves 64 could be distributed around the circumference of the recess 63. These grooves 64 constitute, together with the annular gap 48, a return system through which the pressure chamber 47 is filled with the pressure medium supplied from the external connecting pipe 38 via the non-return lip 53 which gives access to the return system in this direction. As with the embodiment shown in FIG. 2, the connecting pipe and the return pipe according to FIG. 3 extend jointly over part of their length, and the central axial bore 37 is sealed off against the buffer piston 40 and the non-return valve in the return pipe, by a single integral annular packing.

A further detail of this embodiment of the invention is that the cross-section of the restricted zone 46 can be varied by means of an adjusting-screw 65. Again, the movement of the main piston is not damped until the buffer piston 40 is inside the central axial bore 37, since, while the bore is open, the pressure medium can reach the external connecting pipe 38 through it. Damping begins when the buffer piston 40 reaches the annular packing 49, because the pressure medium is forced to pass through the restricted zone 46, the central bore 37 being sealed off by the annular packing 49. With the main piston in the end position shown in the illustration, it can start its stroke towards the other end position very rapidly, the pressure medium being supplied from the external pipe 38 through both the restricting pipe 45 and the system consisting of the annular gap 48, the non-return lip 53, and the groove 64 into the pressure chamber 47.

What we claim is:

1. A piston/cylinder assembly which provides for damping of the piston movement at the end of power strokes which comprises
    a hollow cylinder;
    a main piston positioned within said hollow cylinder for reciprocating movement therein;
    a cylinder cover closing off one of the ends of said hollow cylinder, said cylinder cover having a central axial bore therein;
    a buffer piston connected to said main piston on the side thereof facing said cylinder cover, said buffer piston being of appropriate dimensions to fit within said central axial bore of said cylinder cover;
    a first means in said cylinder cover for conveying pressure medium into or out of said central axis bore from a point outside of said hollow cylinder;
    a second means in said cylinder cover for conveying pressure medium between a pressure chamber, formed between said main piston and said cylinder cover, and said central axial bore;
    means positionable in said second means for restricting the flow of pressure medium therethrough;
    said cylinder cover including means forming an annular recess at a corner thereof which faces said main piston and which faces said central axial bore; and
    an annular packing ring fixedly mounted in said annular recess and capable of engaging said buffer piston to seal thereagainst as said buffer piston enters said central axial bore of said cylinder cover during a power stroking movement of said main piston, the means forming said annular recess and said annular packing ring together providing a bypass between said pressure chamber and said central axial bore, said packing ring in cross-section comprising a double lip portion of generally rectangular configuration, a first side having an indentation therein forming an upper lip and a lower lip, said lower lip angling away from said upper lip and forming a sealing lip which is engagable with said buffer piston as said buffer piston enters said central axial bore; an inner portion extending away from said double lip portion and generally parallel to an axis through said sealing lip; and a non-return lip connected to said inner portion, said non-return lip extending generally parallel to, but away from, a second side of said double lip portion opposite to the first side containing said indentation, and which is positionable to prevent pressure medium bypass and pressure medium discharge from said pressure chamber through said bypass during movement of said main piston towards said cylinder cover and to allow bypass of pressure medium from said central axial bore to said pressure chamber during movement of said main piston away from said cylinder cover.

2. The piston/cylinder assembly of claim 1 wherein a rigid mounting ring is attached to said annular packing ring, said rigid mounting ring having an L-shaped configuration and contacting the second side of said double lip portion opposite to the first side and a third side of said double lip portion between said first and second sides and opposite to the sealing lip.

3. The piston/cylinder assembly of claim 2 wherein said means forming said annular recess includes means forming at least one axially extending groove located between said rigid mounting ring of said annular packing ring and said cylinder cover.

4. The piston/cylinder assembly of claim 3 wherein said non-return lip of said annular packing ring extends sufficiently away from said second surface of said double lip portion and said rigid mounting ring mounted thereon to leave a space therebetween.

* * * * *